Jan. 6, 1970  V. C. BRAUN ETAL  3,487,602
WINDOW FRAME AND GLAZING MEMBERS FOR A METAL DOOR
Filed May 24, 1967

INVENTORS
VINCENT C. BRAUN,
& EARLE A. MILLER
BY WATTS & FISHER
ATTORNEYS

United States Patent Office 3,487,602
Patented Jan. 6, 1970

3,487,602
WINDOW FRAME AND GLAZING MEMBERS FOR A METAL DOOR
Vincent C. Braun and Earle A. Miller, Warren, Ohio, assignors to The American Welding & Manufacturing Company
Continuation-in-part of application Ser. No. 584,841, Oct. 6, 1966. This application May 24, 1967, Ser. No. 647,287
Int. Cl. E06b 3/70, 7/08; E02c 2/38
U.S. Cl. 52—455   5 Claims

ABSTRACT OF THE DISCLOSURE

An apparatus for mounting glass in a hollow sheet metal door including separable frame units and glazing means, the glazing means being fitted in recesses in certain of the frame units.

---

This application is a continuation-in-part of copending application Ser. No. 584,841, filed Oct. 6, 1966, and now abandoned. The door disclosed herein and the method of making it are more fully disclosed in copending application Ser. No. 587,903, filed Oct. 19, 1966.

BACKGROUND OF THE INVENTION

This invention relates generally to the steel door art and more particularly to a new combined friction strip and glazing frame construction and cooperating glazing molding and glazing beads for full flush doors of the hollow steel construction type.

Many efforts have been made heretofore by others to provide means for readily installing and maintaining sheets of glass in sheet metal doors. Many of the proposed structures with which we are familiar have been costly, complicated and cumbersome, difficult to assemble and disassemble, and not completely reliable in operation. So far as we known, the patents which show structures most nearly like that of the present invention are U.S. Patents Nos. 1,223,609; 1,594,765; 2,190,263; and 3,112,534. None of these structures is free from all the disadvantages of the prior art and none possesses all the advantages of the present construction.

SUMMARY

Briefly stated, the present invention aims to avoid the disadvantages and shortcomings of the prior art and attains that object by providing a sectional frame for a window opening in a sheet metal door, each section consisting of a recessed metal glazing frame and a sheet metal friction strip and glass retaining glazing moldings and beads in the recesses. The assembly of the frame sections with the door and the assembly of the glazing molding and beads with the frame sections may be quickly and easily performed by unskilled labor. The glazing molding and beads may be readily removed, and replaced, as desired, for insertion of the glass and glazing compound. The frame members for the window opening support and stiffen the front and back sheets of the door adjacent to the opening.

The present invention will be better understood by those skilled in the art from the following specification and the accompanying drawings in which.

Figure 6:
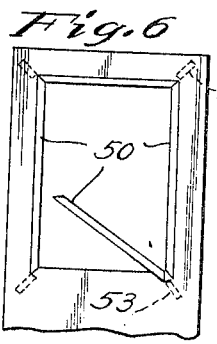
Figure 7:
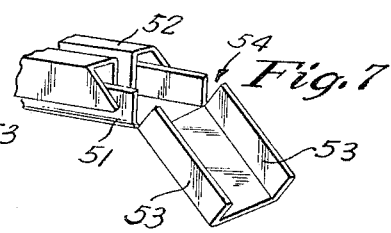

FIG. 6 indicates extensions on friction strips of certain of the window frame units; and FIG. 7 is a fragmentary view showing, in perspective, part of a frame unit in which the friction strip is extended beyond and is weakened adjacent to the end of the glazing frame and is bent at the point of weakening.

Figure 1:
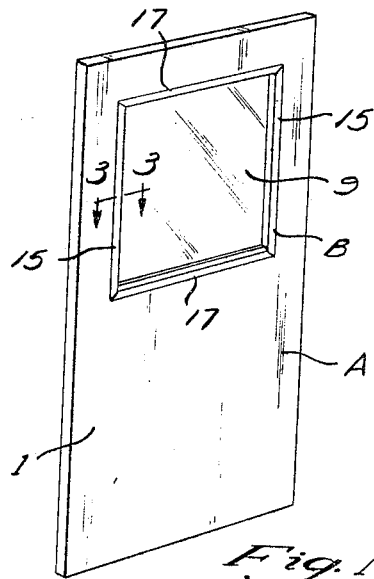
FIG. 1 is a perspective view of a metal door equipped with the combined friction strip and glazing frame, embodying the present invention.

FIG. 1 shows, fragmentarily, a full flush door A of the hollow steel construction type. The door A consists of front and rear sheet metal sides or sheets 1 and 3 cut away to form a window opening 9. The sectional frame consists of two vertical units or members 15 and two horizontal units or members 17.

Figure 2:
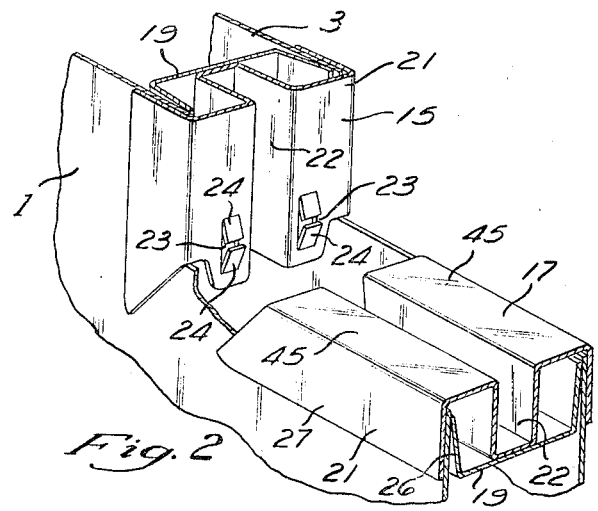
FIG. 2 is a fragmentary, exploded, perspective view of the mating ends of two of the sectional frame members of FIG. 1.
Figure 3:
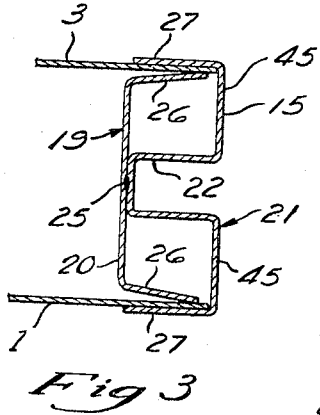
FIG. 3 is a fragmentary, cross sectional view taken on line 3—3 of FIG. 1.
Figure 4:
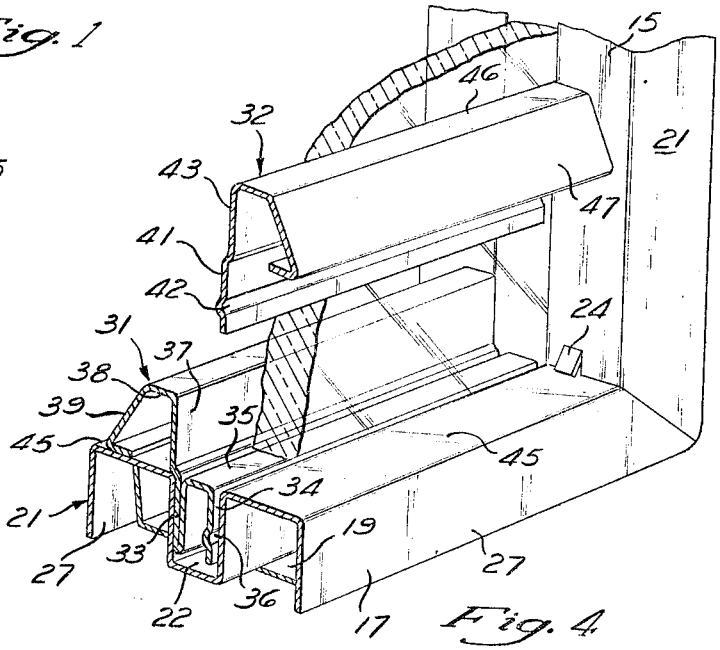
FIG. 4 is a fragmentary perspective, partly exploded view showing vertical and horizontal frame members and a glazing molding and a glazing bead partly assembled therewith.
Figure 5:
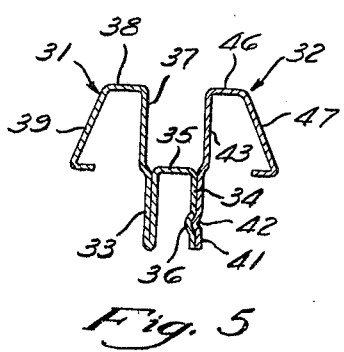
FIG. 5 is a cross section view of the glazing molding and bead of FIG. 4 in assembled position.

As FIGS. 2 and 3 show, each of these four members or units consists of a friction strip 19 and a glazing frame 21. The friction strip 19 is channel shaped in cross section, having a web 20 and edge flanges 26 projecting divergingly therefrom. The glazing frame 21 is provided with a longitudinally extending recess 22 and marginal flanges 27. Each friction strip 19 is attached to its glazing frame 21 preferably by spot welding the web 20 to the bottom wall of the recess as indicated at 25.

When a frame unit consisting of friction strip 19 and glazing frame 21 is assembled with the front and rear sheets 1 and 3 of the door A, the flanges 26 of the friction strip will lie between those sheets and bear against the inner surfaces thereof while the flanges 27 of the glazing frame 21 will enclose the edges of sheets 1 and 3 and engage the outer surfaces of those sheets. Thus the edges of the sheets 1 and 3 will be engaged frictionally between, and will be supported and stiffened by, flanges 26 and 27 of the frame member.

The lower ends of the glazing frames of the vertical units 15 are pierced as at 23 and are provided with outwardly pressed tabs 24.

The several units, each consisting of friction strip 19 and glazing frame 21, may be assembled with the door by bringing the free edges of sides 1 and 3 between and in contact with the flanges 26 of the friction strip 19 and the flanges 27 of the glazing frame 21. Preferably, the two vertical frame members are assembled with the vertical edges of the window openings, as by placing the lower end of one combined member in the stated position with the door sheets and then swinging the member into vertical position thereby bringing the member into contact throughout its length with the two sides of the door. The horizontal members 17 of the frame may, likewise, be assembled with the door by placing one end of the horizontal member between the tabs 24 at one end of one vertical member 15 and the door sheets between flanges 26 and 27 with the inner surface of flange 27 on the horizontal member riding over the outer surface of flange 27 of the vertical member 15. Then the horizontal member may be swung into horizontal position thereby bringing the member into contact for its full length with the two sides of the door and its other end between the tabs 24 on the opposite vertical frame member. When all four members are so assembled, the window opening in the door will be framed by the several frame members and they will form a continuous recess for the means to retain a pane of glass.

The glass retaining means includes a glazing molding 31 and a glazing bead 32 arranged in pairs in the recess 22 in each of the horizontal frame members 17. Each glazing molding 31 is made of sheet metal and includes a body portion and a bracing portion. The body portion includes a double wall 33, a single wall 34 and a connecting wall 35. The body portion is positioned in the recess 22 and extends almost across it with the surface of connecting wall 35 being substantially flush with the surfaces 45 of the adjacent frame members 17. The wall 34 is provided with a longitudinally extending indentation 36. The bracing portion of molding 31 includes a wall 37 which extends outwardly from the wall 33, projects laterally as at 38, then reversely as at 39, toward surface 45 of the adjacent horizontal member 17 and finally extends toward wall 37 to lie on surface 45 of the adjacent member 17. Thus, the glazing molding 31 almost fills the recess 22 in frame member 17, projects outwardly therefrom and is braced on surface 45 of member 17.

Glazing bead 32 includes a wall 41 to be positioned in recess 22 beside wall 34 of the molding 31 and has a longitudinally extending rib 42 to seat in the indentation 36 of member 31. The glazing bead 32 has a brazing portion which includes a wall 43 which extends outwardly from the wall 41, then inclines laterally as at 46 and reversely, as at 47, toward member 17 to rest on the adjacent surface 45 of frame 17. Thus, the glazing molding and bead, when assembled with a horizontal frame member 17, will be interengaged in recess 22 of the frame member, will be braced by engagement with the surfaces 45 of the frame member on opposite sides of recess 22 and will define a space which is aligned with, and of substantially the same width as the recesses 22 in the vertical frame members 15.

When glass is to be assembled in the window frame, moldings 31 are put into the horizontal recesses 22, or left therein if already there.

Usually a bead of glazing compound is put into the vertical recesses 22 along substantially their full length, and some compound may be placed along the walls 37 of the glazing moldings. Glass is then installed by sliding it in a horizontal direction into the vertical recess 22 in one glazing frame, then swinging it into alignment with the opposite vertical recess 22 and moving it horizontally until its edges lie in both vertical recesses. This operation is facilitated by the presence of the surface of connecting wall 35 of member 31 on which the glass may be slid. Glazing compound is applied to the horizontal exposed edges of the glass. The glazing beads 32 are pressed into place in the horizontal recesses 22 between the moldings 31 and the sides of the recesses 22 with the ribs 42 being brought in the indentations 36 of glazing moldings 21. The spaces between the glass and the molding frame members and the glazing frame members are then filled with glazing compound.

While the door is braced by the frame members, it is desirable in many instances to afford additional internal bracing. FIGS. 6 and 7 show one form of such additional bracing which may be readily obtained by modifying the friction strips of FIGS. 1 to 5 in certain respects.

In FIGS. 6 and 7, 50 designates frame members which are like the frame members 15 and 17 of FIG. 1 with the exception that the friction strip 51 is extended beyond one end of the glazing frame 52 and is weakened adjacent to that end, as by notching the flanges 53 as indicated at 54, and the portion of the friction strip 41 beyond the notches is bent at an angle to the remainder thereof. The extensions 53 of FIG. 7 and the positions they occupy when assembled with the door are indicated in FIG. 6.

Thus it will be seen that the frame members afford support for the free edges of the front and rear sheets of the door at the window opening and the extensions 53 of the friction strips afford added support adjacent to but some little distance removed from the free edges of those sheets.

The simplicity of structure of the present invention is clear from the drawings and the ease of making and assembling the frame and glazing parts with a metal door and assembly glass in the glazing parts are believed to be clear from the description in the specification. That the several parts will retain their assembled position in use is assured by the interengaging contact of the frame members with the sides of the door and with one another and the glazing members with one another and with the frame members. The glazing frame members are locked in the window frame recesses and are braced against that frame. This construction assures firm mounting of the glass and retention of it against forces exerted against it such as slamming of the door. No special tools, and only unskilled labor, is required to assemble the frame and glazing members and glass in the door. When a glass is to be removed, the glazing beads may be readily removed as by prying them out of the recesses with a screw driver.

It will be seen that the present invention provides simple, inexpensive and quite satisfactory means for mounting glass in a metal door.

Having thus described this invention in such full, clear, concise and exact terms as to enable any person skilled in the art to which it pertains to make and use the same, and having set forth the best mode contemplated of carrying out this invention, we state that the subject matter which we regard as being our invenion is particularly pointed out and distinctly claimed in what is claimed, it being understood that equivalents or modifications of, or substitutions for, parts of the above specifically described embodiment of the invention may be made without departing from the scope of the invention as set forth in what is claimed.

What is claimed is:

1. A hollow door having front and rear sheet metal sides and provided with a rectangular opening, and a frame in said opening, said frame comprising a plurality of frame units arranged vertically and horizontally to form a frame for said opening, each unit comprising an elongated sheet metal friction strip nested in an elongated sheet metal glazing frame, said friction strip being channel-shaped in cross section and having a web portion and diverging side flanges and said glazing frame being generally channel-shaped in cross section, having a depressed midportion partly defining a longitudinal recess, and having marginal, substantially parallel side flanges, the flanges of the glazing frame overlapping and lying outside of the flanges of the friction strip and defining longitudinally extending tapered spaces therebetween to receive the edge portions of said front and rear sheet metal sides of the door, said flanges being so positioned relative to each other as to bear against and frictionally engage the inner and outer surfaces of said sides and to support and stiffen said sides, and glass-retaining means positioned in the recess of the glazing frame of each horizontal unit, said glass-retaining means including a glazing molding and a glazing bead positioned in the recess of each of said horizontal glazing frames.

2. A window frame unit for mounting a glass window in a hollow door having front and rear sheet metal sides comprising an elongated sheet metal friction strip nested in and attached to an elongated sheet metal glazing frame, said friction strip being channel-shaped in cross section and having a web portion and diverging side flanges, said glazing frame being generally channel-shaped in cross section and having marginal substantially parallel side flanges, said glazing frame having a midportion depressed to form a longitudinal recess, the flanges of the glazing frame overlapping and lying outside of the flanges of the firction strip and defining longitudinally extending tapered spaces therebetween to receive the degree portions of said front and rear sides, said flanges being so positioned relative to each other as to bear against and frictionally engage the inner and outer surfaces of said front and rear sides and to support and stiffen said sides, said friction strip extending beyond, and being notched adjacent to one end of the attached glazing frame to facilitate bending of said strip and insertion of the bent portion between said front and rear sheets of said door to stiffen said sheets.

3. A window frame comprising a plurality of frame units for mounting a glass window in a hollow door having front and rear sheet metal sides, said units being arranged vertically and horizontally to define a rectangular opening, each said unit comprising an elongated sheet metal friction strip nested in an elongated sheet metal glazing frame, said friction strip being channel-shaped in cross section and having a web portion and diverging side flanges, said glazing frame being generally channel-shaped in cross section and having marginal substantially parallel side flanges, said glazing frame having a midportion depressed to form a longitudinal recess, the flanges of the glazing frame overlapping and lying outside of the flanges of the friction strip and defining longitudinally extending tapered spaces therebetween to receive the edge portions of said front and rear sides, said flanges being so positioned relative to each other as to bear against and frictionally engage the inner and outer surfaces of said front and rear sides and to support and stiffen said sides, and tabs extending outwardly from the glazing frames of certain of said units for interengagement with ends of glazing frames of other adjacent units.

4. A window frame unit for mounting a glass window in a hollow door having front and rear sheet metal sides comprising an elongated sheet metal friction strip nested in an elongated sheet metal glazing frame, said friction strip being channel-shaped in cross section and having a web portion and diverging side flanges, said glazing frame being generally channel-shaped in cross section and having marginal substantially parallel side flanges, said glazing frame having a midportion depressed to form a longitudinal recess, the flanges of the glazing frame overlapping and lying outside of the flanges of the friction strip and defining longitudinally extending tapered spaces therebetween to receive the edge portions of said front and rear sides, said flanges being so positioned relative to each other as to bear against and frictionally engage the inner and outer surfaces of said front and rear sides and to support and stiffen said sides, and glass retaining means including a glazing molding and a glazing bead positioned in said depressed portion of the glazing frame.

5. The window frame unit set forth in claim 4 in which the glazing molding and glazing bead are assembled in side by side interengaging relationship in, and substantially filling, the said recess in one of the frame units and projecting therefrom and defining therebetween a space for a glass window having a thickness substantially the width of the recess in the frame unit.

References Cited
UNITED STATES PATENTS

| | | | |
|---|---|---|---|
| 1,959,597 | 5/1934 | Plym | 52—118 |
| 2,116,846 | 5/1938 | Pilcher | 52—312 |
| 2,219,714 | 10/1940 | Sperry | 52—716 X |
| 2,827,670 | 3/1958 | Schwindt | 52—627 X |
| 2,930,459 | 3/1960 | Moser | 52—717 |
| 1,863,722 | 6/1932 | Levene | 52—498 |
| 2,694,476 | 11/1954 | Hanssen | 52—627 X |
| 2,700,441 | 1/1955 | Cudini | 52—214 |

JOHN E. MURTAGH, Primary Examiner

U.S. Cl. X.R.

52—476, 498, 620, 627, 656

PO-1050
(5/69)

UNITED STATES PATENT OFFICE
CERTIFICATE OF CORRECTION

Patent No. 3,487,602          Dated January 6, 1970

Inventor(s) Vincent C. Braun and Earle A. Miller

It is certified that error appears in the above-identified patent and that said Letters Patent are hereby corrected as shown below:

Column 1, line 39, "known" should be -- know --.
Column 4, line 67, "firction" should be -- friction --;
line 68, "degree" should be -- edge --.

SIGNED AND
SEALED
MAY 12 1970

(SEAL)
Attest:

Edward M. Fletcher, Jr.
Attesting Officer

WILLIAM E. SCHUYLER, JR.
Commissioner of Patents